(12) United States Patent
Jackson

(10) Patent No.: US 6,661,188 B2
(45) Date of Patent: Dec. 9, 2003

(54) CATHODE RAY TUBE FILAMENT VOLTAGE CONTROL WITH A MULTIFREQUENCY DEFLECTION SCANNER

(75) Inventor: David Ross Jackson, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/351,220

(22) Filed: Jan. 24, 2003

(65) Prior Publication Data

US 2003/0197695 A1 Oct. 23, 2003

Related U.S. Application Data

(60) Provisional application No. 60/373,875, filed on Apr. 19, 2002.

(51) Int. Cl.[7] .................................................. H01J 29/70
(52) U.S. Cl. ........................ 315/411; 315/367; 315/408
(58) Field of Search ................................. 315/411, 367, 315/399, 408, 105; 348/805, 829

(56) References Cited

U.S. PATENT DOCUMENTS

| 4,245,180 A | * | 1/1981 | Rilly et al. ................. 315/411 |
| 4,766,390 A | * | 8/1988 | Wharton et al. .............. 327/44 |
| 4,845,410 A | * | 7/1989 | Sutton ......................... 315/411 |
| 4,985,665 A | * | 1/1991 | Sendelweck ................ 315/386 |
| 5,940,147 A | * | 8/1999 | Huang ......................... 348/730 |
| 5,961,648 A | | 10/1999 | Choi et al. .................. 713/323 |
| 5,994,852 A | * | 11/1999 | Lee ............................. 315/408 |
| 6,049,880 A | | 4/2000 | Song ........................... 713/300 |
| 6,054,981 A | | 4/2000 | Kimoto et al. .............. 345/211 |

* cited by examiner

*Primary Examiner*—Don Wong
*Assistant Examiner*—Thuy Vinh Tran
(74) *Attorney, Agent, or Firm*—Joseph S. Tripoli; Harvey D. Fried; Sammy S. Henig

(57) ABSTRACT

A power supply for a video display tube includes a deflection transformer with a primary winding powered with a scan voltage which has a first value when displaying signal according to a first video standard and a second voltage when displaying video according to a second standard. A secondary winding of the transformer produces filament voltage for the display tube. A variable coupler couples the filament voltage to the filament of the picture tube in an amount established by a control signal. A memory produces a first control signal in response to the first scan voltage and a second control signal in response to the second scan voltage. The first and second control signals are selected so that the voltage coupled from the transformer to the filament is the same at both scan voltages.

18 Claims, 3 Drawing Sheets

CATHODE RAY TUBE FILAMENT VOLTAGE CONTROL WITH A MULTIFREQUENCY DEFLECTION SCANNER

This application claims the priority of Provisional application No. 60/373,875 filed Apr. 19, 2002.

FIELD OF THE INVENTION

This invention relates to filament power supplies for display tubes, and more particularly to such supplies for powering filaments in the context of multiple scan frequencies.

BACKGROUND OF THE INVENTION

Video display tubes such as television picture tube are vacuum tubes which ordinarily use a filament to heat the cathode in order to free electrons from the cathode. The electrons from the cathode are accelerated toward the ultor or phosphor faceplate to generate a luminescent dot. The dot is scanned over the face of the picture tube, which creates a bright display. The intensity of the electron beam is modulated in consonance with the scanning to create a picture.

In the past, television or video picture tubes have been supplied with voltage from a horizontal deflection transformer driven from a regulated scan voltage at the horizontal scan frequency, which pursuant to National Television Standards Committee (NTSC) standards corresponds to about 15,734 Hz. The high voltage for the picture tube ultor is commonly generated by rectifying the voltage from a high voltage secondary winding of a deflection transformer, and the filament of the picture tube was driven by alternating voltage from a filament secondary winding of the transformer. The regulation of the scan voltage was believed to be sufficient to maintain the filament voltage within the nominal filament supply voltage range of the picture tube. If the filament voltage deviates from the nominal value, picture tube life can be adversely affected.

The advent of multi-function high definition television (HDTV) and NTSC display systems requires that the display system be operable at both the NTSC standard deflection frequency and another, higher, HDTV deflection frequency. When a picture tube is to be used with both NTSC and with HDTV, the deflection frequency used for NTSC is often 2H, where H represents the NTSC deflection frequency. The HDTV deflection frequency used for this purpose may be, for example, 2.14H. Because of the differing horizontal scan frequencies of HDTV and NTSC systems, a picture tube scanned at those disparate frequencies would, in the absence of compensation for the effects of the deflection frequencies, scan different portions of the phosphor screen, depending upon the scan frequency. In order to cause the scanned portion of the phosphor screen to be the same when displaying NTSC or HDTV, the scan voltage may be increased in proportion to the scan frequency. It should be noted that, by contrast with HDTV, video pursuant to NTSC standards is often referred to as having "standard definition."

When two different scan voltages are applied to the deflection transformer, depending upon whether the video is standard definition or HDTV, the voltage produced by the filament winding of the deflection transformer varies.

One possible way to regulate the filament voltage of a television display tube is to produce alternating filament voltage, rectify the alternating voltage to produce pulsating voltage or current, and to filter the pulsating current by the use of capacitors, to thereby produce direct voltage. In this context, the term "pulsating" differs from "alternating" in that pulsating voltage or current is principally unidirectional, while alternating generally suggests voltages taking opposite polarities relative to zero and currents flowing in generally equal amounts in both directions. The direct voltage produced by rectification and filtration can then be regulated in a conventional manner to produce the desired value of filament voltage. This approach is effective, but the cost may be greater than desired, because filament currents in video display devices may be on the order of ¾ ampere, and the capacitors required for filtering may be large, expensive, and subject to aging. The active devices required for regulating voltage at the required currents tend to be expensive because of the relatively high power being controlled, and their mountings also tend to be expensive because of the heat to be removed.

According to an aspect of the invention, a controllable coupling device is coupled between the filament voltage winding of a deflection transformer and the filament(s) of a display tube, to control the magnitude of the coupling under the control of a control signal, and the control signal is selected to provide the same filament voltage regardless of the applied scan voltage. The controllable coupling device may be viewed as a variable voltage divider, a variable load, a variable current shunt, or a level shifter.

SUMMARY OF THE INVENTION

A video display power supply for energizing a filament load of a cathode ray tube according to an aspect of the invention comprises a source of an input supply voltage, and also comprises a switching semiconductor coupled to the input supply voltage source for generating an alternate current, unregulated supply output at a frequency related to a deflection frequency. The unregulated supply output is applied to the filament load unfiltered, with respect to the frequency of the unregulated supply output, to develop in the filament load an unfiltered, second supply output. The video display power supply also includes a regulator for regulating the second supply output, and a source of regulation control signal. The regulation control signal has a value selected from a range of values, and is coupled to an input of the regulator for regulating the second supply output in accordance with the selected value of the control signal.

According to another aspect of the invention, a video display power supply energizes a filament load of a cathode ray tube. The video display power supply according to this other aspect of the invention comprises a power supply power stage for generating an unregulated supply output voltage at a frequency related to a deflection frequency, where the deflection frequency being selected from a range of frequencies. A regulator applies the unregulated supply output voltage to the filament load to generate in the filament load a regulated supply output voltage. A source of regulation control signal is coupled to a control input of the regulator and has a selectable first value when a first deflection frequency is selected and a selectable second value when a second deflection frequency is selected for regulating the unregulated supply output voltage in accordance with the selected deflection frequency.

DESCRIPTION OF THE INVENTION

Figure 1A:
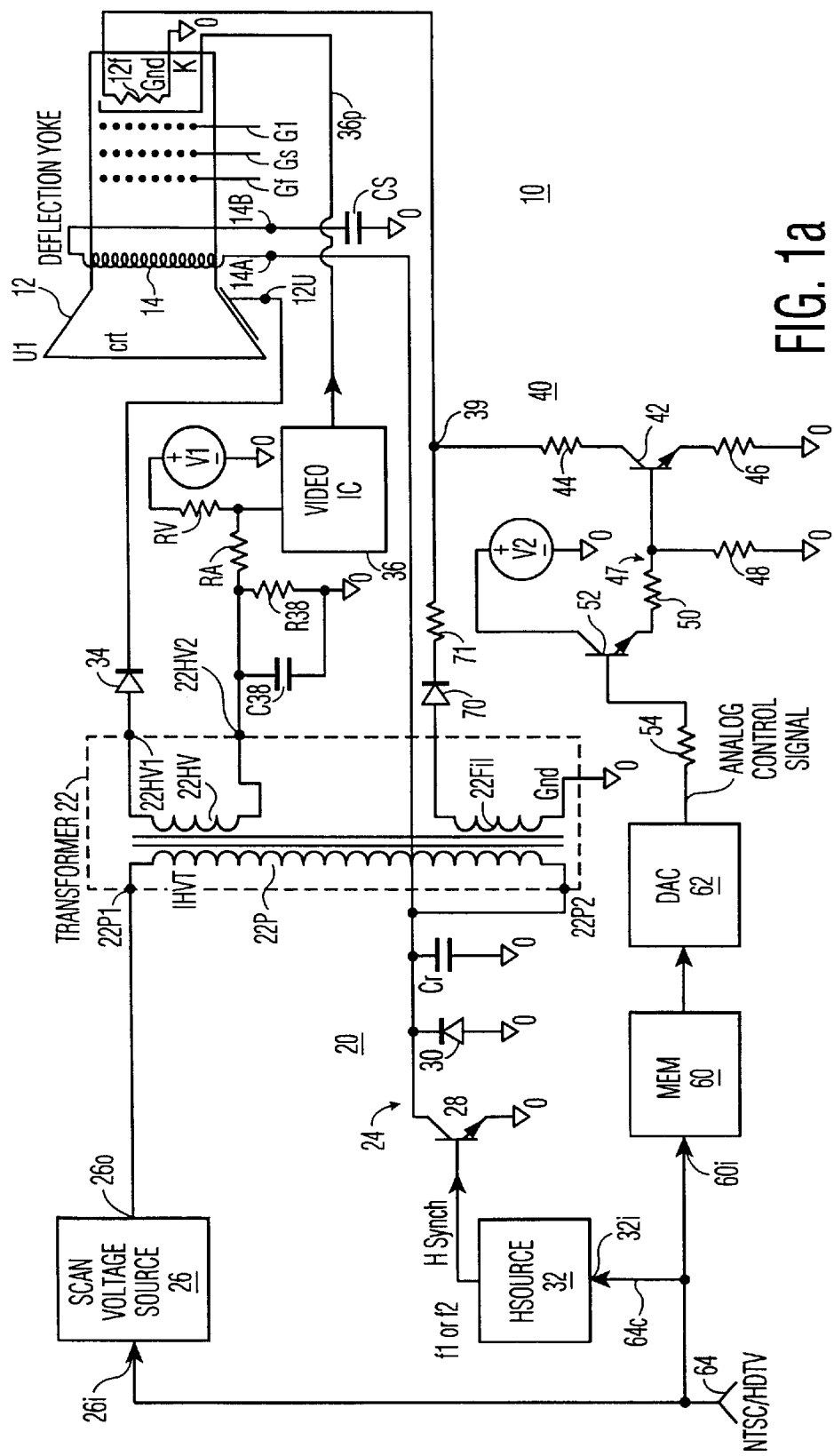
FIG. 1a is a simplified diagram in block and schematic form of a first embodiment of a display arrangement according to an aspect of the invention.

In FIG. 1a, a video display apparatus 10 includes a picture tube or cathode-ray tube (CRT) 12 having an ultor or high voltage terminal 12u and a cathode (K) filament 12f. A horizontal deflection winding 14 having terminals 14A and 14B is illustrated as being associated with picture tube 12.

Also in FIG. 1a, a horizontal deflection arrangement designated generally as 20 includes a transformer 22 and a horizontal deflection circuit 24. Transformer 22 includes a primary (PRI) winding 22P, a high voltage winding 22HV with terminals 22HV1 and 22HV2, and a filament winding 22FIL. A terminal 22P1 of primary winding 22P is connected to the output terminal 26o of a controllable scan voltage source 26. Scan voltage source 26 produces a first scan voltage under the control of the first state of a signal applied to its input terminal 26i, and produces a second voltage, greater than the first, in response to the second state of the control signal. Another terminal 22P2 of primary winding 22P of transformer 22 is connected to the collector of a high voltage switching NPN transistor 28. High voltage switching transistor 28 has its emitter coupled to ground. A diode 30 has its anode connected to the collector of transistor 28. A horizontal-frequency (H) source 32 produces base drive for transistor 28 at disparate drive frequencies f1 or f2, which in one embodiment of the invention corresponds to either 2h or 2.14H, under the control of a control signal applied to its input terminal 32i.

Terminal 22HV1 of high voltage winding 22HV of transformer 22 of FIG. 1a is connected to ultor 12U of picture tube 12 by way of a rectifying arrangement, illustrated in simplified form as a single rectifier 34. Rectifier 34 rectifies the high voltage pulses produced by winding 22HV to generate the ultor voltage for ultor terminal 12U. Terminal 22HV2 of winding 22HV is connected across a capacitor C38 and resistor R38, and by way of a series resistor RA to a video integrated circuit 36. Integrated circuit 36 is coupled to the cathode K of picture tube 12, as suggested by path 36p. A resistor RV is connected to a direct supply voltage source V1 and video IC 36 for energizing the IC. During normal operation, capacitor 38 is normally at a low positive voltage, and little current flows through resistor RA. When a very bright scene occurs, current in the high voltage winding 22HV tends to discharge capacitor C38, which tends to draw current through resistor RA, which in turn tends to reduce the available energizing voltage for video integrated circuit 36. The reduction in the energizing voltage for integrated circuit 36, in turn, tends to reduce the anode current, all in known manner.

Horizontal deflection winding 14 of FIG. 1a is coupled to the collector of switching transistor 28. The conventional operation of switching transistor 28 at the frequency established by a horizontal (H) source, in conjunction with a conventional damper diode 30 and retrace capacitor Cr, generates deflection current through horizontal deflection winding 14 of FIG. 1a, which in turn causes the electron beam of the picture tube 12 to deflect in a horizontal direction.

Figure 1B:
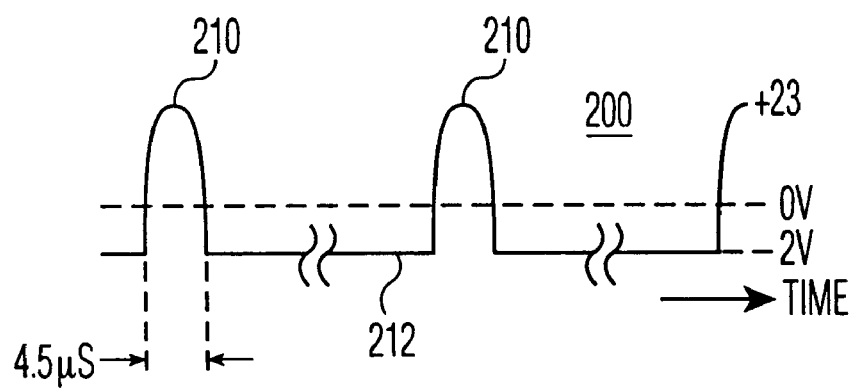
FIG. 1b is an amplitude-time plot of voltages which may occur in the arrangement of FIG. 1a during operation.

Filament winding 22FIL of FIG. 1a produces pulsatory voltages, which are illustrated generally as 200 in FIG. 1b. In FIG. 1b, the average voltage 200 produced by winding 22FIL is zero volts, and the positive-going pulses 210 have a peak value of about 23 volts and a duration of about 4.5 :S. The negative value 212 lying between the pulses 210 is in the range of about 2 volts. The pulsatory voltages produced by filament winding 22FIL are applied through a rectifier 70 and a resistor 71 to the filaments 12f of picture tube 12. A control circuit designated generally as 40 is connected between ground and the junction 39 of resistor 71 with filament 12f. In effect, control circuit 40 is coupled across filament 12f, where the term "across" is used in its electrical, rather than physical, sense. With this connection, control circuit 40 is effectively in parallel (shunt) with filament 12f. Thus, increasing conduction in control circuit 40 increasingly bypasses or shunts current away from filament 12f, thereby decreasing the current available to filament 12f, and effectively reducing the voltage at the filament. Correspondingly, reduced conduction of control circuit 40 bypasses or shunts less current away from filament 12f, thereby leaving more current available for the filament, thereby increasing the filament voltage. Thus, varying conduction of control circuit 40 adjusts the voltage across, and the current through, filament 12f.

Control circuit 40 of FIG. 1a includes an NPN transistor 42 having its emitter coupled to ground by way of a resistor 46, and its collector coupled by way of a resistor 44 to junction 39. The conduction of transistor 42 is controlled by base current or voltage applied to the base of the transistor by way of a resistive voltage divider 47 including resistors 48 and 50. Looking at the operation of the control circuit 40 as being a level shifter, the collector current of transistor 42 may be considered to be a constant current during those intervals in which its collector-to-base voltage reverse-biases the junction. This constant current flows to ground from junction 39, and reduces the current available for filament 12f. Alternatively, the constant current through the collector of transistor 42 may be viewed as increasing the voltage drop across series resistor 70, which in turn reduces the voltage available for filament 12f.

The action of the control circuit 40 may be viewed in another way. More particularly, the serial combination of resistors 44 and 46, in conjunction with transistor 42, may be viewed as being one leg of a voltage divider including series resistor 71 and the shunt (as to filament 12F) control circuit 40. As the conduction of the shunt leg (the leg in parallel with the filament 12F) of the voltage divider increases, more of the pulsatory voltage produced by filament winding 22FIL is developed across resistor 41, and less across the parallel combination of the shunt leg 40 and filament 12f. Similarly, as the conduction of the shunt leg 40 of the voltage divider decreases, more of the pulsatory voltage produced by filament winding 22FIL is produced across the parallel combination of shunt leg and the filament 12f, so more voltage is available across filament 12f.

A memory 60 of FIG. 1a addresses an internal memory location under the control of a control signal applied to its input port 60i by way of a coupling path 64c. In a first state of the control signal applied to port 64, the memory addresses a first memory location, and in a second state of the control signal, the memory addresses a second memory location. The signal from the addressed memory location is applied to a digital-to-analog converter (DAC) 62, which converts the digital signal from the memory into a corresponding analog signal. The analog signal is applied from DAC 62, by way of a resistor 54 and an emitter follower 52, to the voltage divider 47 and the base of transistor 42, for controlling the conduction of transistor 42.

In operation of the arrangement of FIG. 1b, an HDTV/NTSC control signal is applied by way of terminal 64 to input port 26i of scan voltage source 26, input port 32i of H source 32, and to input port 60i of memory 60. In a first state of the control signal, which may be assumed to be for selecting NTSC operation, scan voltage source 26 produces a first, relatively low voltage, H source 32 produces signals at frequency 2H for driving horizontal deflection circuit 24, and memory 60 addresses a first memory location, preprogrammed with a digital word representing a voltage. The voltage representing digital word, when applied by way of resistor 54, emitter follower 52, and voltage divider 47 to the base of transistor 42, causes conduction of control circuit 40 sufficient to maintain the filament voltage of filament 12f within its nominal value in an open loop manner. When HDTV operation is commanded by altering the state of the HDTV/NTSC signal, the voltage produced by scan voltage source 26 increases to maintain constant product of scan time and supply voltage. This increase in scan voltage would ordinarily be expected to increase the value of the pulsatory filament voltage produced by filament winding 22FIL. When HDTV operation is commanded by the HDTV/NTSC signal, H source 32 produces frequency 2.14H, and memory 60 addresses another memory location, which is preprogrammed with a digital word representing a voltage which, when applied by way of resistor 54, emitter follower 52, and voltage divider 47 to the base of transistor 42, causes conduction of control circuit 40 sufficient to maintain the filament voltage of filament 12f within its nominal value. Thus, the filament voltage is held near its nominal value regardless of the scan voltage.

Figure 2:
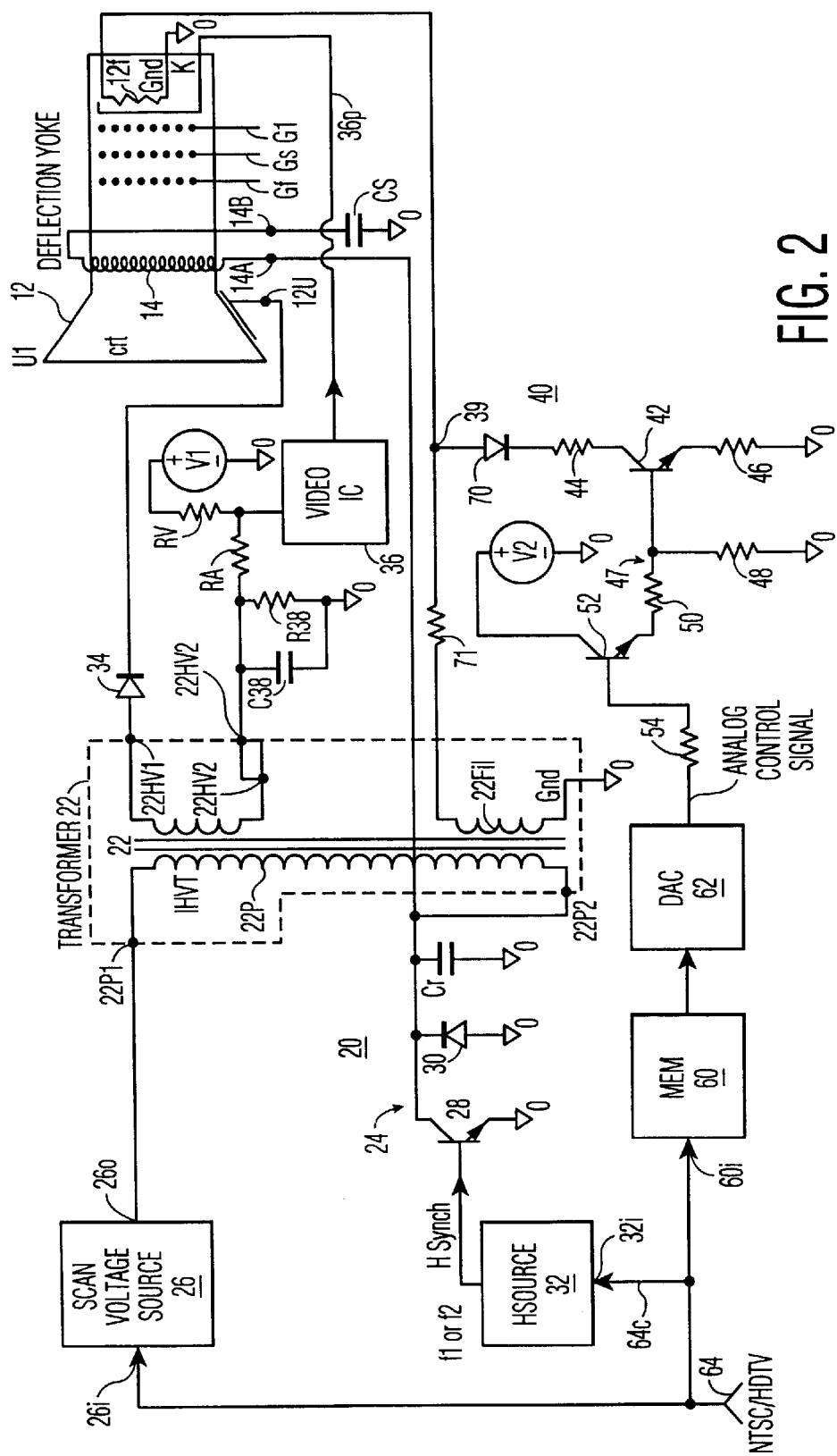
FIG. 2 is a simplified diagram in block and schematic form of another embodiment according to an aspect of the invention.

FIG. 2 illustrates an alternative embodiment of this aspect of the invention. FIG. 2 is very similar to FIG. 1a, with the only difference lying in the location of rectifier 70. In FIG. 2, rectifier 70 no longer lies in the path extending from filament winding 22FIL and the filament 12f, so a part of the alternating voltage 200 of FIG. 1b is applied to the filament 12f. Rectifier 70 is instead located in series with resistor 44 of control circuit 40, so that the collector-to-base junction of transistor 42 does not become forward biased by application of a negative voltage (212 of FIG. 1b) thereto.

A salient advantage of the arrangement according to the invention is that a series regulator with a associated filter capacitor need not be used to control the voltage applied to filament 12F.

Other embodiments of the invention will be apparent to those skilled in the art. For example, while FIG. 1a shows the series resistor 71 connected between filament winding 22FIL and the filament 12f as being a single resistor, it may be advantageous from a cost point of view to use a plurality of resistors, so that inexpensive low-power resistors may be used instead of more expensive higher-power resistors.

What is claimed is:

1. A video display power supply for energizing a filament load of a cathode ray tube, said power supply comprising;
    a source of an input supply voltage;
    a switching semiconductor coupled to said input supply voltage source for generating an alternate current, unregulated supply output at a frequency related to a deflection frequency; said unregulated supply output being applied unfiltered, with respect to said frequency of said unregulated supply output, to said filament load to develop in said filament load an unfiltered second supply output;
    a regulator for regulating said second supply output; and
    a source of regulation control signal having a value selected from a range of values coupled to an input of said regulator for regulating said second supply output in accordance with said selected value of said control signal.

2. The video display power supply according to claim 1, wherein said deflection frequency is selected from a range of frequencies and wherein said regulation control signal has a first value when a first deflection frequency is selected and a second value when a second deflection frequency is selected for regulating said second supply output in accordance with the selected deflection frequency.

3. The video display power supply according to claim 2, wherein said unregulated supply output is developed in a transformer.

4. The video display power supply according to claim 3, wherein said switching semiconductor is coupled to said transformer, wherein said input supply voltage is coupled to said transformer, and wherein said input supply voltage has a magnitude when said first deflection frequency is selected, that is different from when said second deflection frequency is selected.

5. The video display power supply according to claim 2, wherein said switching semiconductor is coupled to a resonant circuit for generating resonant pulses in said resonant circuit that is transformer coupled to develop said unregulated supply output in a winding of said transformer.

6. The video display power supply according to claim 2, wherein said switching semiconductor is coupled to a resonant circuit that includes a deflection winding for generating a trace portion and a retrace portion of said unregulated supply output during a trace interval and a retrace interval, respectively, and wherein a magnitude of said input supply voltage magnitude differs when said first deflection frequency is selected, from said input supply voltage magnitude, when said second deflection frequency is selected, in a manner to produce an amplitude of a deflection current in said deflection winding that is the same at each of said first and second deflection frequencies.

7. The video display power supply according to claim 6, wherein said regulator operates, during said retrace interval, and is disabled, during said trace interval.

8. The video display power supply according to claim 2, wherein said regulation control signal source comprises a digital-to-analog converter having its analog side coupled to said input of said regulator, and a preprogrammed digital memory coupled to a digital side of said digital-to-analog converter.

9. The video display power supply according to claim 8, wherein said digital memory comprises at least first and second preprogrammed memory locations.

10. The video display power supply according to claim 9, wherein said memory produces said regulation control signal from said first preprogrammed memory location when said first deflection frequency is selected, and from said second preprogrammed memory location when said second deflection frequency is selected.

11. The video display power supply according to claim 1, wherein said regulator performs level shifting.

12. The video display power supply according to claim 1, wherein said regulator is controlled in an open-loop manner with respect to said regulation control signal.

13. The video display power supply according to claim 1, wherein said regulation control signal source comprises a digital-to-analog converter having its analog side coupled to said input of said regulator, and a preprogrammed digital memory coupled to a digital side of said digital-to-analog converter.

14. The video display power supply according to claim 1, wherein said regulator comprises a resistor coupled to a shunt transistor having a control terminal responsive to said regulation control signal.

15. A video display power supply for energizing a filament load of a cathode ray tube, comprising:
    a power supply power stage for generating an unregulated supply output voltage at a frequency related to a deflection frequency, said deflection frequency being selected from a range of frequencies;

a regulator for applying said unregulated supply output voltage to said filament load to generate in said filament load a regulated supply output voltage; and a source of regulation control signal coupled to a control input of said regulator and having a selectable first value when a first deflection frequency is selected and a selectable second value when a second deflection frequency is selected for regulating said unregulated supply output voltage in accordance with the selected deflection frequency.

16. The video display power supply according to claim 15, wherein said power supply power stage comprises an inductor coupled to a semiconductor switch and a source of an input supply voltage coupled to said inductor; said input supply voltage having a magnitude when said first deflection frequency is selected, that is different from when said second deflection frequency is selected.

17. The video display power supply according to claim 16, wherein said semiconductor switch is coupled to a resonant circuit for generating resonant pulses in said resonant circuit that is transformer coupled to develop said unregulated supply output voltage in a winding of said transformer.

18. The video display power supply according to claim 17, wherein said resonant circuit includes a deflection winding for generating a trace portion and a retrace portion of said unregulated supply output voltage.

* * * * *